United States Patent
Horst

(10) Patent No.: US 7,618,280 B2
(45) Date of Patent: Nov. 17, 2009

(54) WIRE CLAMP SYSTEM FOR AN ELECTRICAL CONNECTOR

(75) Inventor: Sheldon Lynn Horst, Columbia, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/869,851

(22) Filed: Oct. 10, 2007

(65) Prior Publication Data
US 2009/0098762 A1 Apr. 16, 2009

(51) Int. Cl.
*H01R 13/58* (2006.01)
(52) U.S. Cl. ..................................................... 439/460
(58) Field of Classification Search ............... 439/471, 439/460, 470, 465, 467, 446, 488, 464, 468, 439/445
See application file for complete search history.

(56) References Cited

U.S. PATENT DOCUMENTS

| | | | |
|---|---|---|---|
| 3,603,913 A | 9/1971 | Hasty | |
| 3,622,942 A * | 11/1971 | Rynk | 439/471 |
| 3,638,169 A | 1/1972 | Caveney et al. | |
| 3,720,906 A | 3/1973 | Punako et al. | |
| 3,732,526 A * | 5/1973 | Punako | 439/471 |
| 3,792,417 A | 2/1974 | Punako | |
| 4,483,579 A | 11/1984 | Derr et al. | |
| 5,620,334 A | 4/1997 | Quillet et al. | |
| 5,700,156 A | 12/1997 | Bussard et al. | |
| 6,135,807 A | 10/2000 | Lai et al. | |
| 6,478,609 B1 | 11/2002 | Davis et al. | |
| 7,044,795 B2 * | 5/2006 | Diep | 439/610 |
| 2002/0151209 A1 * | 10/2002 | Milanowski et al. | 439/460 |
| 2004/0077211 A1 | 4/2004 | Silva | |

FOREIGN PATENT DOCUMENTS

WO  WO 2007/089593  8/2007

OTHER PUBLICATIONS

Merriam-Webster's Collegiate Dicttionary, Tenth Edition, Copyright 1994, p. 244, Merriam-Webster, Inc., Springfield, MA USA.
PCT International Search Report; International Application No. PCT/US2008/011521; International Filing Date Oct. 6, 2008.

* cited by examiner

*Primary Examiner*—Edwin A. Leon

(57) ABSTRACT

A wire clamp system is disclosed that includes a wire clamp and a wire tie. The wire clamp includes a clamping section having slots configured to receive a wire tie and secure a wire bundle within the clamping section. The wire clamp may be connected to an electrical plug or receptacle connector housing.

26 Claims, 9 Drawing Sheets

WIRE CLAMP SYSTEM FOR AN ELECTRICAL CONNECTOR

FIELD OF THE INVENTION

The present invention relates generally to electrical connectors, and more particularly to a wire clamp system for an electrical connector.

BACKGROUND OF THE INVENTION

An electrical connector assembly generally includes a connector and a wire bundle. The wire bundle may be a wire, cable or similar conductor that is inserted into a connector. Prior art connectors have been molded with a wire clamp attached thereto, or a separate wire clamp may be attached to the connector. The wire clamp is intended to provide strain relief to the wire bundle, which can effectively withstand a withdrawal force acting on the wire bundle to prevent a separation of leads of the wire bundle from contacts contained within the connector.

The connector may generally include a housing and a number of contacts fixed within the housing. The wire bundle has a number of leads extending into the housing and connected to the contacts. The wire clamp, either connected to the housing or attached thereto, transmits a withdrawal force exerted on the wire bundle to the housing of the connector, rather than directly to the wire bundle, thereby preventing a separation of leads of the wire bundle from the contacts contained within the connector.

For example, U.S. Pat. No. 4,483,579 discloses an electrical connector having plug part and a wire clamp attached thereto. The wire clamp includes a clamping yoke. The clamping yoke is provided in two halves that are assembled by screws. When the yoke is assembled around a wire bundle, the yoke secures the wire bundle to the connector. However, this connector has multiple parts that increase cost, and has multiple assembly requirements that allow for parts to become lost during assembly. The disclosure of U.S. Pat. No. 4,483,579 is incorporated by reference in the entirety herein.

In general, prior wire clamp systems have only been able to consistently achieve a secure connection to a wire bundle and housing to provide effective strain relief effective to withstand a withdrawal force when using small hardware such as screws and inserts that easily become lost during assembly. Additionally, prior wire clamp assemblies often require numerous parts that increase cost and complexity of the connector. Therefore, there is a need for a wire clamp assembly and a connector having a wire clamp assembly that can provide stain relief to a wire bundle to prevent separation from the connector contacts that is inexpensive and simple to use.

SUMMARY OF THE INVENTION

In a first embodiment of the invention, a wire clamp system including a wire clamp and a wire tie is disclosed. The wire clamp relieves strain applied to a wire bundle. The wire clamp system includes a connector housing, a wire clamp, and a wire tie. The wire clamp includes a front cylindrical section, a conical section, and a clamping section. The front cylindrical section may have internal threads to connect the wire clamp to a housing of an electrical connector.

The clamping section includes slots configured to receive the wire tie and secure a wire bundle within the clamping section. The clamping section may include a tie opening configured to receive the wire tie and allow the wire tie to be tightened within the clamping section radius. Alternatively, the clamping section may include slots substantially symmetrically radially spaced around the clamping section and configured to receive the wire tie and secure a wire bundle within the clamping section.

The conical section may have a tapered cross section between the front section and the clamping section. Alternatively, the conical section may have a constant cross section between the front section and the clamping section.

The wire clamp may include a bent section disposed between the conical section and the clamping section. Alternatively, the conical section may be a bent conical section.

In a second embodiment of the invention, a wire clamp including a front cylindrical section, a conical section, and a clamping section is disclosed. The clamping section includes slots configured to receive a wire tie and secure a wire bundle within the clamping section. The front cylindrical section may have internal threads for connecting the wire clamp to a housing of an electrical connector.

The clamping section may further include a tie opening configured to receive the wire tie and allow the wire tie to be tightened within the clamping section radius. Alternatively, the clamping section may comprise slots substantially symmetrically radially spaced around the clamping section.

The conical section may have a tapered cross section between the front section and the clamping section. Alternatively, the conical section may have a constant cross section between the front section and the clamping section.

The wire clamp may include a bent section disposed between the conical section and the clamping section. Alternatively, the conical section may be a bent conical section.

In a third embodiment of the invention, an electrical connector including a connector housing and a wire clamp is disclosed. The wire clamp includes a front cylindrical section, a conical section, and a clamping section. The clamping section includes slots configured to receive a wire tie that secures a wire bundle within the clamping section. The front cylindrical section may have internal threads.

The clamping section may further include a tie opening configured to receive the wire tie and allow the wire tie to be tightened within the clamping section radius. Alternatively, the clamping section may comprise slots substantially symmetrically radially spaced around the clamping section.

The conical section may have a tapered cross section between the front section and the clamping section. Alternatively, the conical section may have a constant cross section between the front section and the clamping section.

The wire clamp may include a bent section disposed between the conical section and the clamping section. Alternatively, the conical section may be a bent conical section.

Further aspects of the method and system are disclosed herein. The features as discussed above, as well as other features and advantages of the present invention will be appreciated and understood by those skilled in the art from the following detailed description and drawings.

DETAILED DESCRIPTION OF THE INVENTION

The present invention now will be described more fully hereinafter with reference to the accompanying drawings, in which a preferred embodiment of the invention is shown. This invention may, however, be embodied in many different forms and should not be construed as limited to the embodiments set forth herein; rather, these embodiments are provided so that this disclosure will be thorough and complete and will fully convey the scope of the invention to those skilled in the art.

Figure 1:
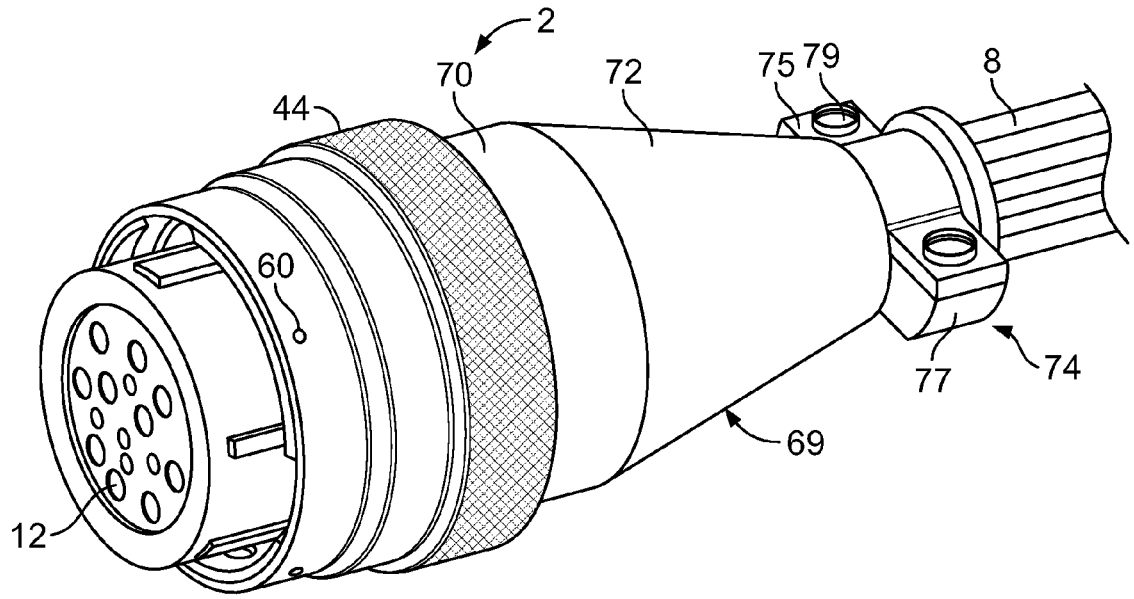
FIG. 1 illustrates a perspective view of a prior art electrical connector including a wire clamp.

Referring to FIG. 1, an exemplary prior art plug connector 2 including a connector housing 44 and a wire clamp 69 is shown. The connector 2 serves to disengageably connect a wire bundle 8 to a receptacle part (not shown). Wire bundle 8 extends and connects to terminals (not shown) within the connector housing 44 that are aligned with plug holes 12 allowing the terminals to be connected to opposing mating terminals (not shown) of the receptacle part. The internal components of connector 2 are disclosed in U.S. Pat. No. 4,483,579, incorporated in the entirety by reference herein, and are generally well known to those in the art.

Figure 2:
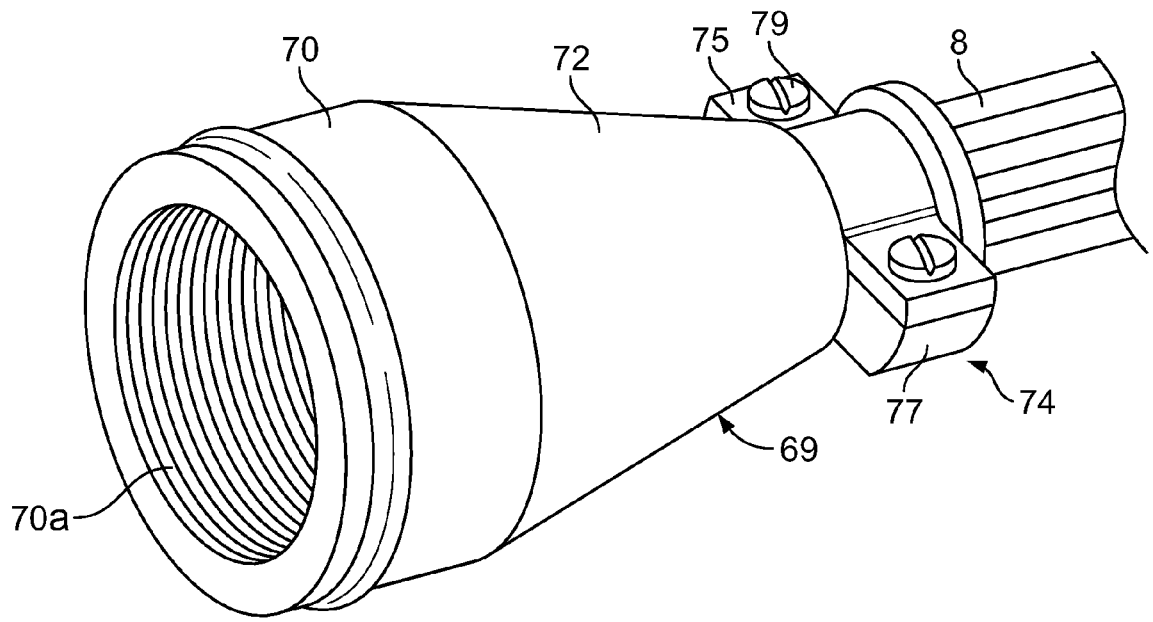
FIG. 2 illustrates a perspective view of the prior art wire clamp of the prior art electrical connector.

As can be seen in FIG. 2, the wire clamp 69 includes a front cylindrical section 70 having internal threads 70a. The internal threads 70a engage with external threads (not shown) on internal parts (not shown) within the coupling ring 44 (FIG. 1) to form the connector 2 shown in FIG. 1. Wire clamp 69 also includes a conical section 72 connected to a yoke 74. Wire bundle 8 is shown only extending into the yoke 74, but it should be understood that wire bundle 8 extends through the wire clamp 69 into terminals (not shown) within the coupling ring 44 (FIG. 1). Yoke 74 includes a top half 75 and a bottom half 77 releasably connected to one another by screws 79. When the top half 75 is securely connected to the bottom half 77 by tightening screws 79, the yoke 74 secures and provides strain relief to wire bundle 8. The amount of strain relief provided by the yoke 74 is related to the amount of normal force the yoke 74 applies to the wire bundle 8. For example, if the wire bundle 8 is not compressed by tightening the screws 79 in the yoke 74, little or no strain relief may be provided to the wire bundle 8. When the yoke 74 does provide some nominal force to the wire bundle 8, the yoke 74 may prevent the wire bundle 8 from being unintentionally disconnected from terminals (not shown) within the connector 2 (FIG. 1) when a withdrawal force is unintentionally applied to the wire bundle 8.

Figure 3:
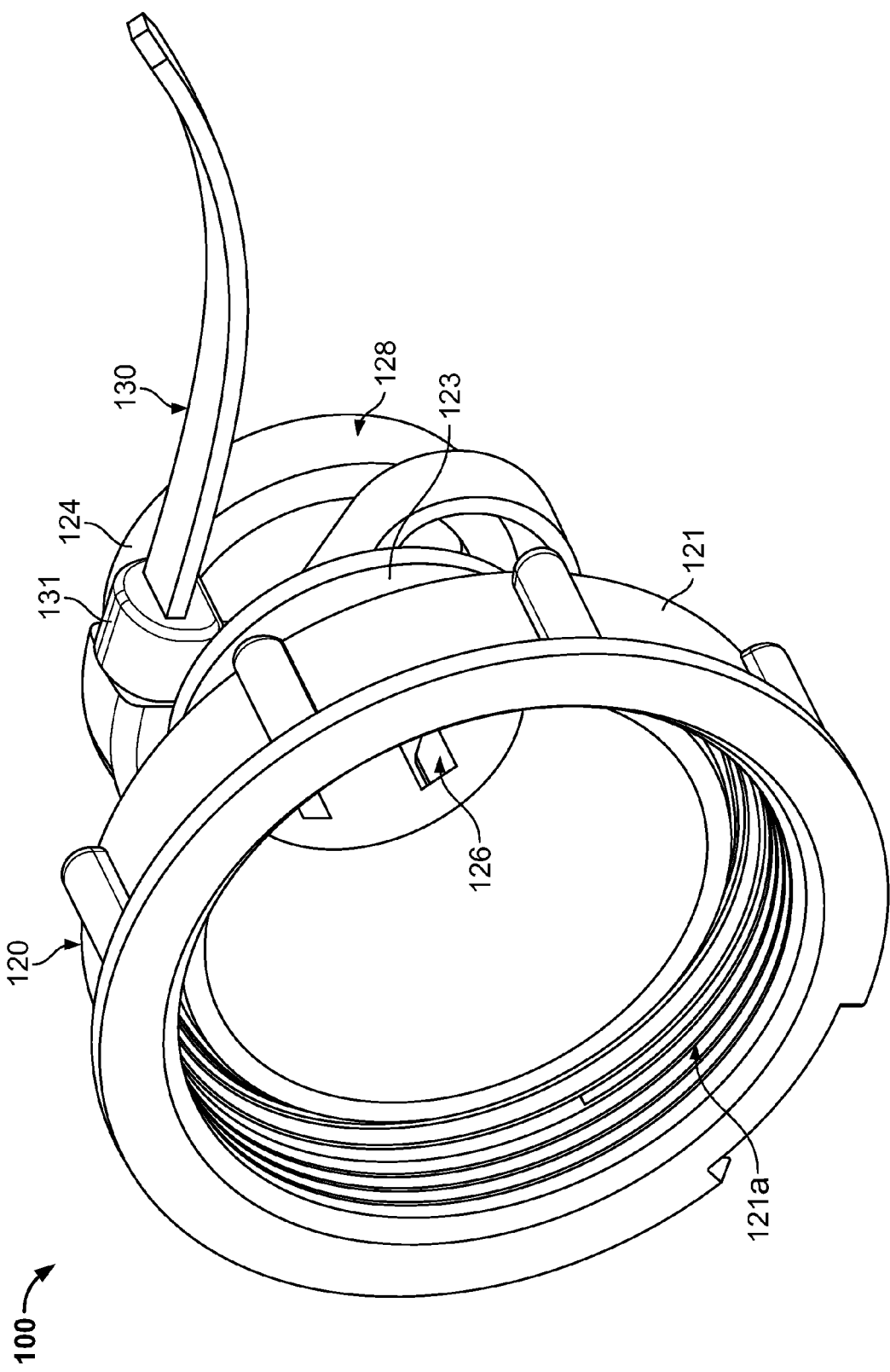
FIG. 3 illustrates a perspective view of an exemplary embodiment of a wire clamp system according to the invention.
Figure 4:
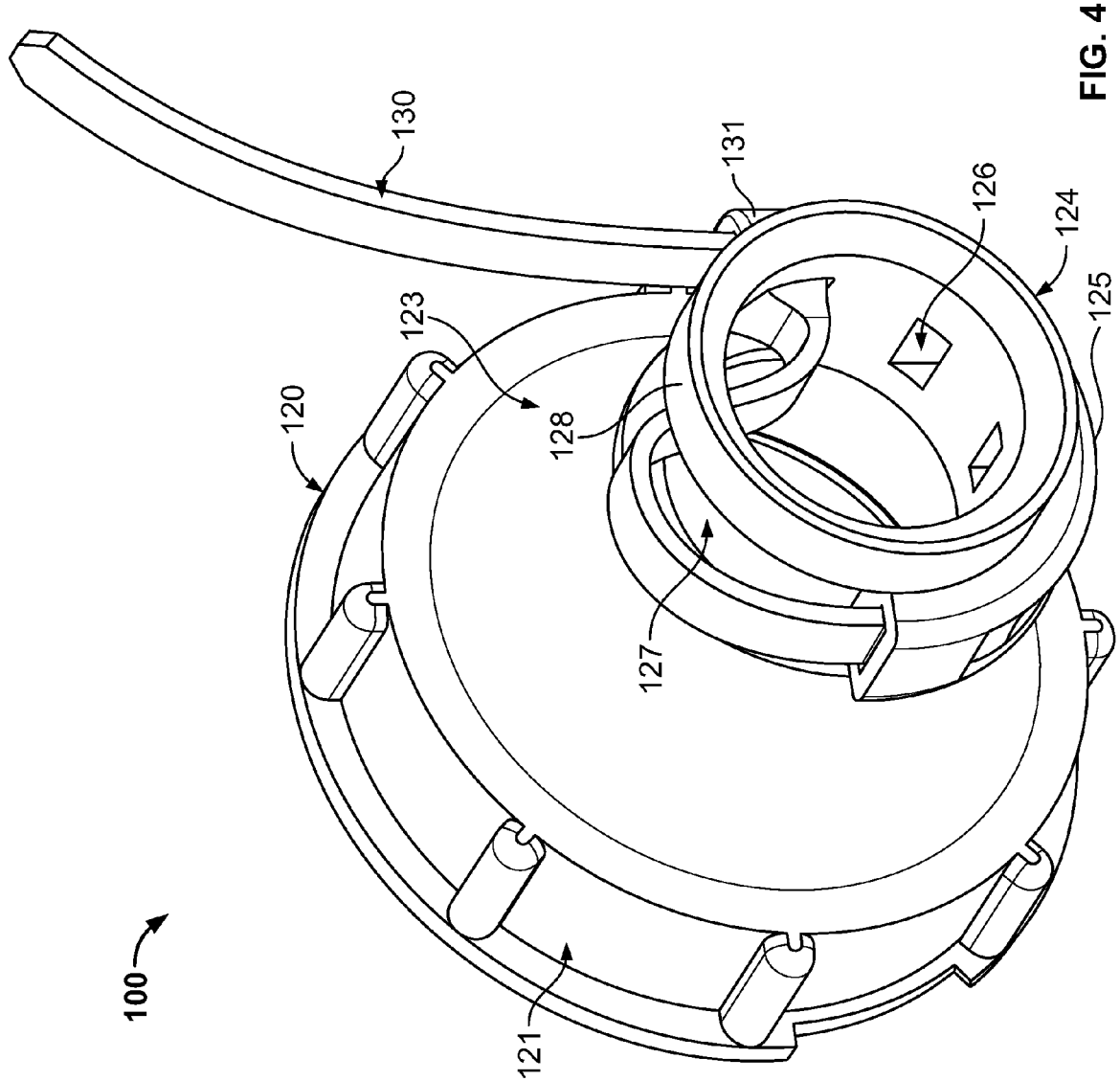
FIG. 4 illustrates a rear perspective view of an exemplary embodiment of a wire clamp system according to the invention.

Referring now to FIGS. 3 and 4, a first exemplary embodiment of a wire clamp system 100 according to the invention is shown. Wire clamp system 100 may be used with a plug connector housing 44 as shown in FIG. 1. It should be appreciated by one of ordinary skill in the art, that the connector housing 44 may be either a plug or receptacle connector housing. Wire clamp system 100 includes a wire clamp 120 and a wire tie 130. The wire clamp 120 includes a front cylindrical section 121, a conical section 123, and a clamping section 124. The front cylindrical section 121 has internal threads 121a. Alternatively, the front cylindrical section 121 may have slots, pins or other fastening structures to connect the wire claim 120 to a coupling ring or similar connector housing structure. The wire clamp 120 may be formed as a single body, such as by injection molding or other similar process. Alternatively, the wire clamp 120 may be formed of separate sections and joined by know processes in the art including gluing and thermal welding. The wire clamp 120 may be formed of a suitable rigid plastic material such as glass-filled nylon. For example, the wire clamp 120 may be formed of a reinforced thermoplastic such as reinforced Nylon 66.

The conical section 123 has a tapered cross section from the front cylindrical section 121 to the clamping section 124 as shown in FIG. 4. The conical section 123 may continuously taper from the front cylindrical section 121 to the clamping section 124 as shown in FIG. 4, or the conical section 123 may stepwise or otherwise non-continuously taper from the front cylindrical section 121 to the clamping section 124. Alternatively, conical section 123 may have a constant cross section from the front cylindrical section 121 to the clamping section 124. As also shown in FIG. 4, the clamping section 124 includes a base section 125, a tie opening 127, a rear cylindrical section 128. The base section 125 includes slots 126.

The wire tie 130, as shown in FIGS. 3 and 4, may be any conventional wire tie known in the art. The wire tie 130 includes engaging section 131. For example, the wire tie 130 may be a 3M Standard Cable Tie 06226, produced by 3M Corporation of St. Paul, Minn. The size of the tie 130 is selected to allow an end of the tie to pass through slots 127. The wire tie 130 applies a predetermined tension to wire bundle 8 (FIG. 1) to secure wire bundle 8 to the clamping section 124.

Figure 5:
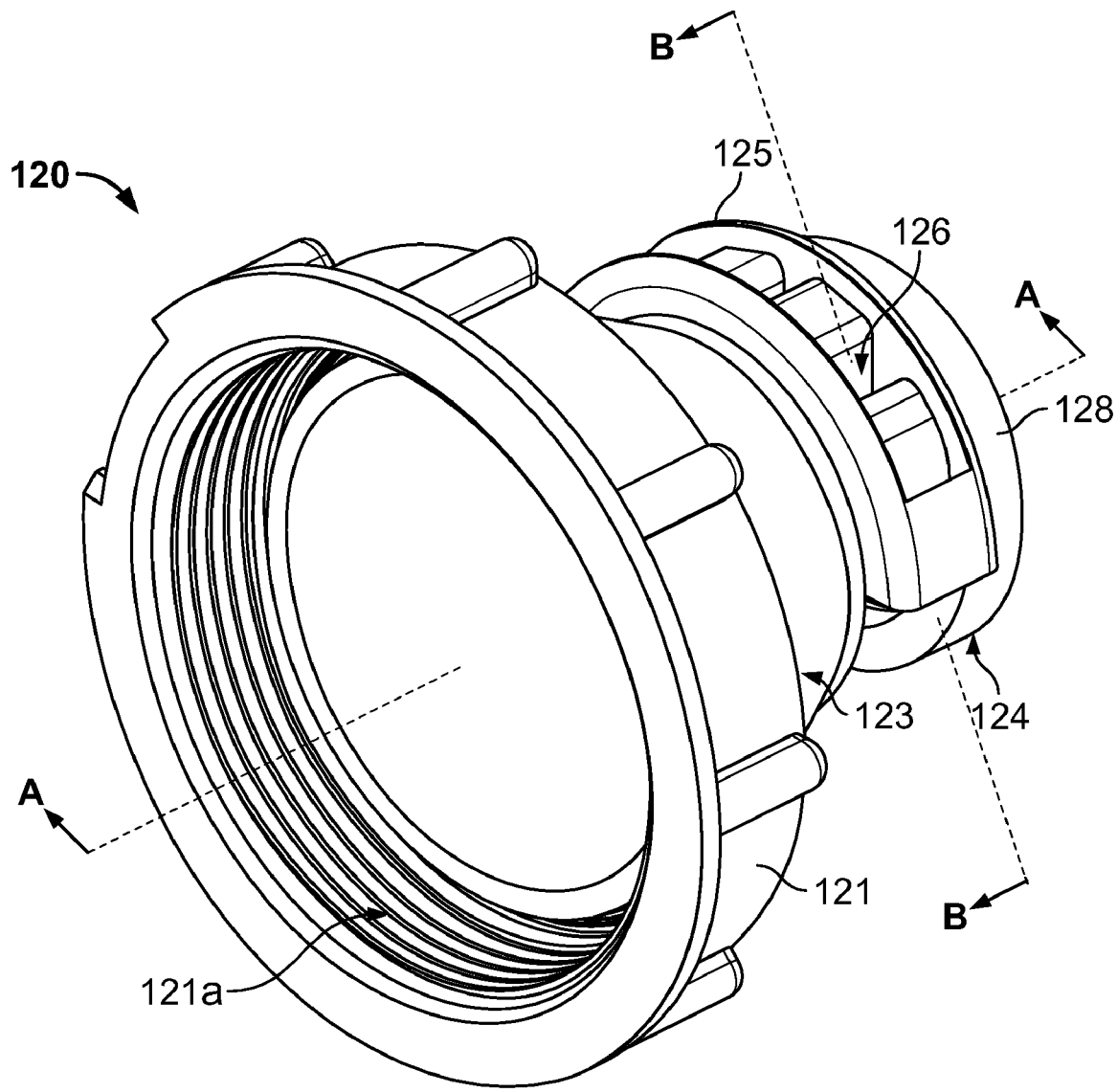
FIG. 5 illustrates a perspective view of an exemplary embodiment of a wire clamp according to the invention.
Figure 6:
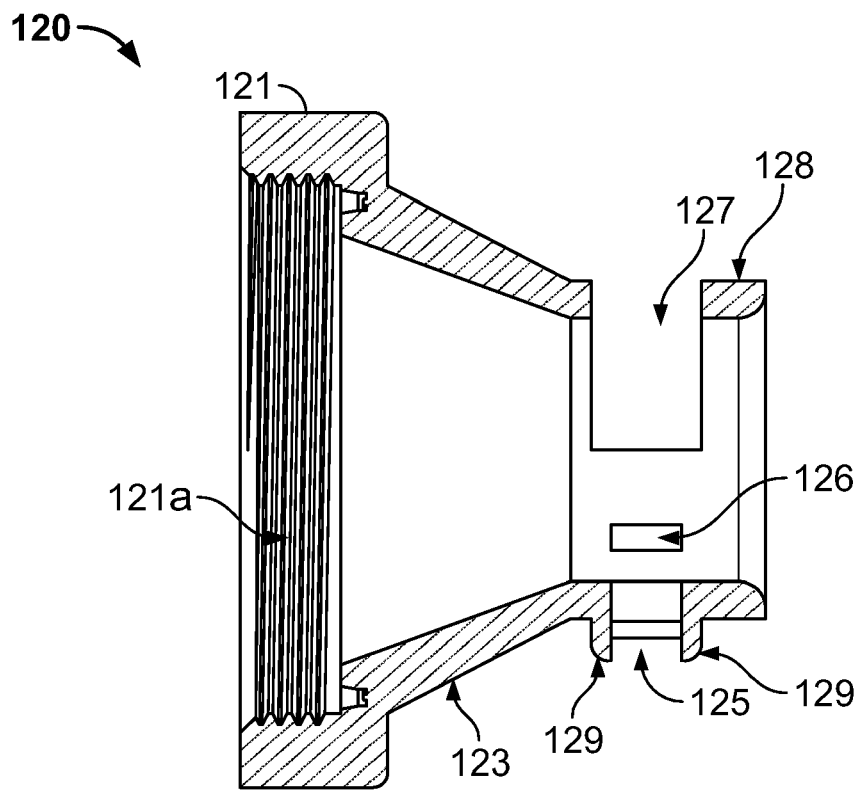
FIG. 6 is a cross sectional view of the wire clamp of FIG. 5 taken along line A-A with open slot 127 facing up.
Figure 7:
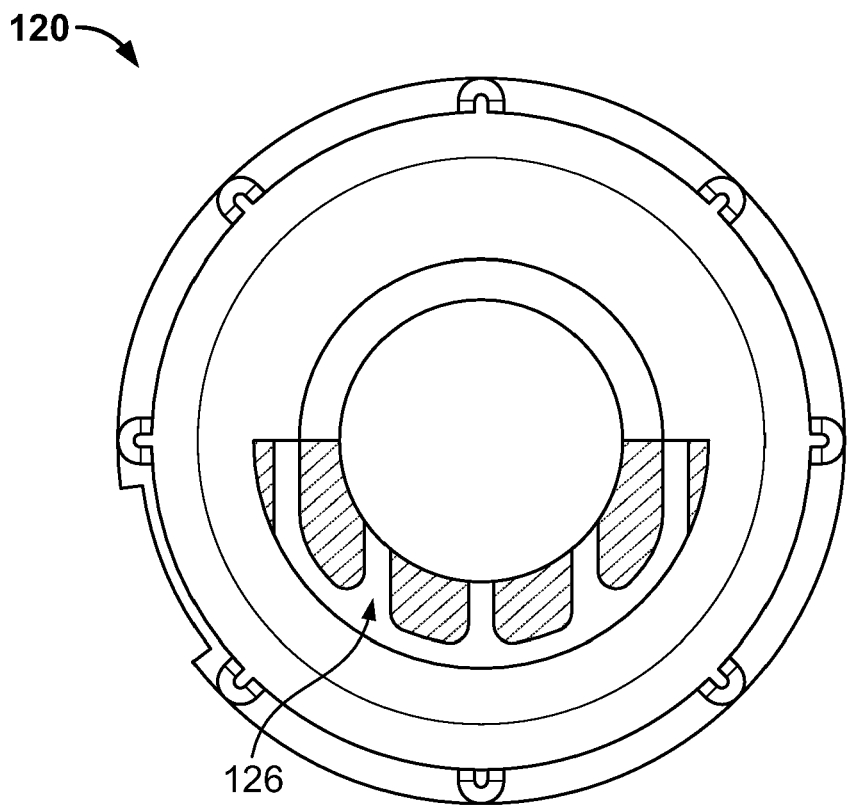
FIG. 7 is a cross sectional view of the wire clamp of FIG. 5 taken along line B-B with the open slot 127 facing up.

FIGS. 5, 6 and 7 show an exemplary embodiment of wire clamp 120. FIG. 5 shows the configuration of the slots 126 in the base section 125. FIG. 6 shows a cross section side view of the wire clamp 120, which more clearly shows the tie opening 127 disposed between the rear cylindrical section 128 and the conical section 123. The tie opening 127 is shown as opening approximately one half of the radius of the clamping section 124 to receive the tie 130 (FIG. 1), however, the amount that the opening may open to receive the tie 130 (FIG. 1) may vary based on the amount of space the wire bundle 8 (FIG. 1) occupies in the clamping section 124. The tie opening allows the wire tie 130 (FIGS. 3 and 4) to be tightening within the radius of the clamping section 124. As can be seen in FIG. 6, a cross section taken along line A-A of FIG. 5, the base section 125 is configured so the tie opening 127 supports a wire tie 130 (FIG. 4) when the wire tie is tightened in the base section 125. As can also be seen in FIG. 6, the base section 125 includes ridges 129 that support the wire tie 130 (FIG. 4) as it is wrapped around the base section 125.

As can be seen in FIG. 7, a cross section taken along line B-B of FIG. 5, the wire clamp 120 includes five slots substantially equally radially spaced in the base section 125. The number of slots 126 may be greater or less than five, and the radial spacing of the slots 126 may vary, depending upon the dimension of the wire bundle 8 (FIG. 1) to be secured to the base section 125.

An exemplary positioning of the wire tie 130 in the wire clamp 120 is shown in FIGS. 3 and 4. As shown in FIG. 4, the wire tie 130 is received in a slot 126 located on a side of the clamping section 124, wrapped around the base section 125, and withdrawn through another slot 127 on an opposite side of the clamping section 124 from where it was received. The wire tie 130 is then engaged with itself through engaging section 131, and may be further tightened to secure a wire bundle (not shown) within the radius of the clamping section 124. In alternative embodiments, the tie 130 may be inserted and withdrawn through different slots 127 in the base section 125 to allow the tie 130 to be tightened so as to a lesser or greater extent. For example, the tie 130 may be inserted though a slot 126 on the side of the base section 125, and withdrawn through an adjacent slot 126. This may be done, for example, when a wire bundle (not shown) occupies only a small space within base section 125. The wire tie 130 is then be engaged with itself as shown in FIGS. 3 and 4. When a wire bundle (not shown) is present, the wire tie 130 may be further tightened to provide a predetermined tensioning the wire bundle.

Figure 8:
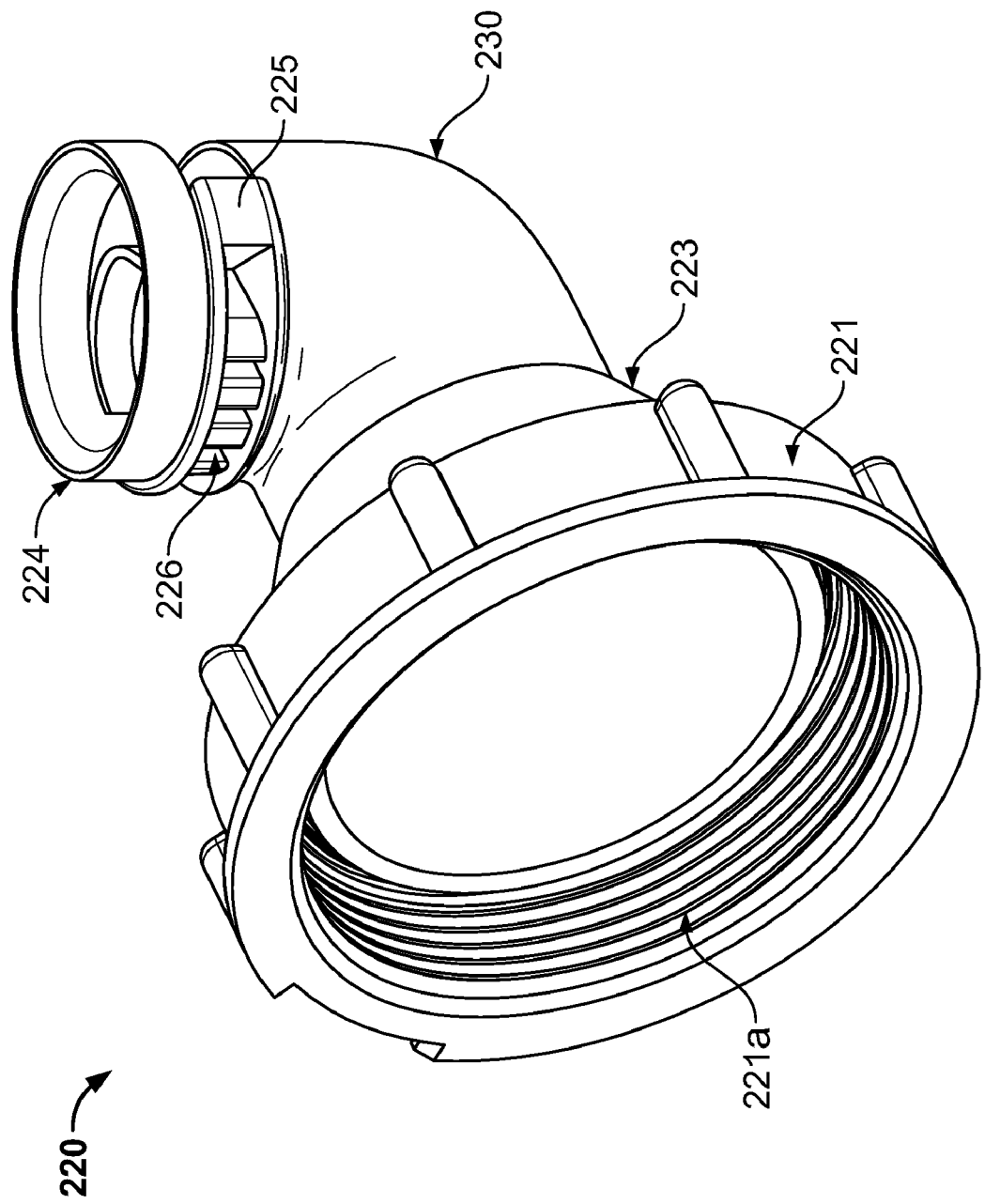
FIG. 8 illustrates a perspective view of a second exemplary embodiment of a wire clamp according to the invention.
Figure 9:
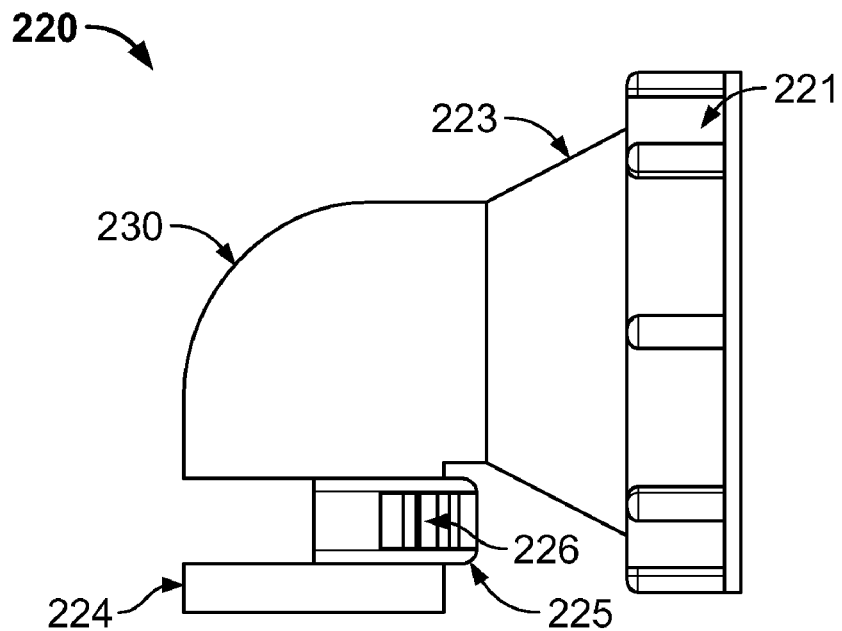
FIG. 9 illustrates an elevation view of the wire clamp of FIG. 8.

A first alternative embodiment of a wire clamp 220 is shown in FIGS. 8 and 9. Wire clamp 220 includes a front cylindrical section 221, a conical section 223, and a clamping section 224. The front cylindrical section 221 includes internal threads 221a. The clamping section 224 includes a base section 225 that includes slots 226. A bend section 230 is disposed between the conical section 223 and the clamping section 224. In this alternative embodiment, the bend section 230 provides an approximate 90 degree connection between the conical section 223 from the clamping section 224. The degree of bend of the bend section 230 may vary more or less than 90 degrees as determined by the application. In this embodiment, the bend section 230 has a uniform diameter, but the bend section 230 may alternatively be formed with a taper.

Conical section 223 is shown having a tapered cross section from the front cylindrical section 221 to the bend section 224. Alternatively, conical section 223 may have a constant cross section or may be stepwise or otherwise non-continuously tapered from the front cylindrical section 221 to the clamping section 224.

Figure 10:
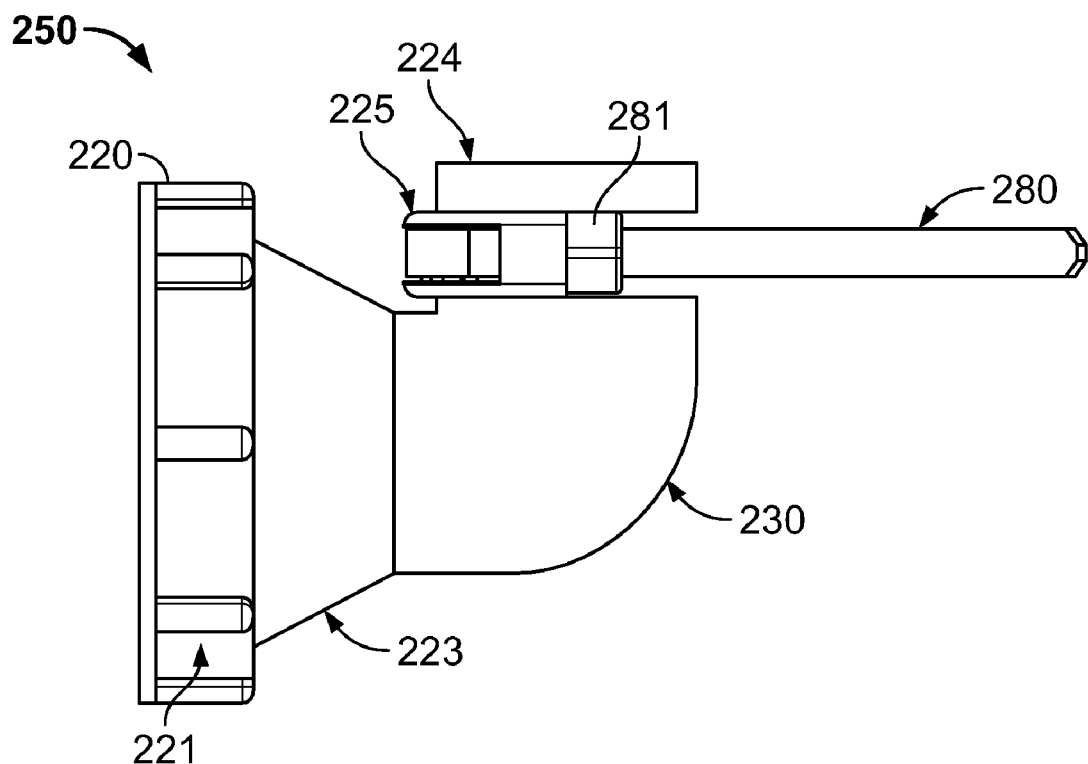
FIG. 10 illustrates an exemplary wire clamp system incorporating the wire clamp of FIG. 8.

A wire clamp system 250 including the wire clamp 220 and a wire tie 280 is shown in FIG. 10. The wire tie 280 is shown placed though slots 226 (not shown) and engaged with itself through engaging section 281.

Figure 11:
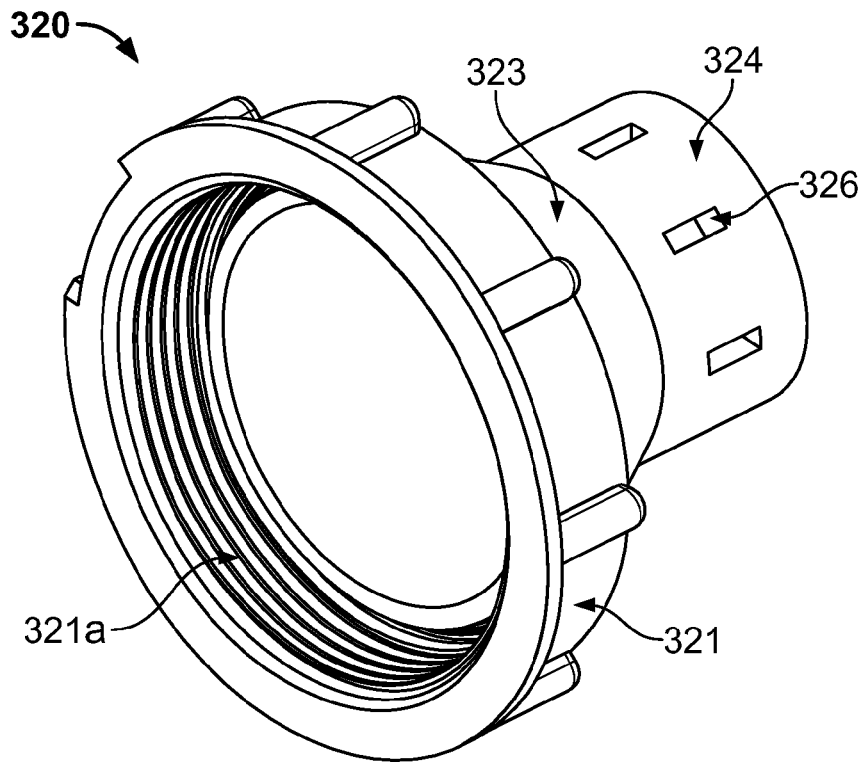
FIG. 11 illustrates another exemplary embodiment of a wire clamp according to the invention.
Figure 12:
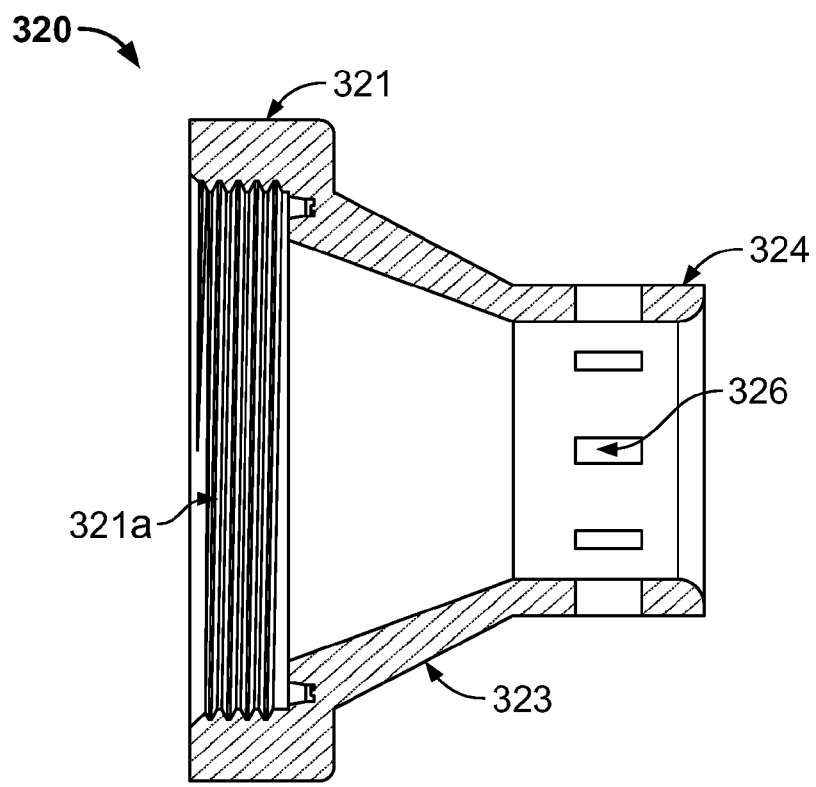
FIG. 12 is a cross sectional view of the wire clamp taken along line B-B of FIG. 11.

A second alternative embodiment of a wire clamp 320 is shown in FIGS. 11 and 12. The housing 320 includes a front cylindrical section 321 having internal threads 321a, a conical section 323, and a clamping section 324. The clamping section 324 includes slots 326. Conical section 323 has a tapered cross section from the front cylindrical section 321 to the clamping section 324. Alternatively, conical section 323 may have a constant cross section or may be stepwise or non-continuously tapered from the front cylindrical section 321 to the clamping section 324. Additionally, the wire clamp 320 may have a bent section (not shown) disposed between the conical section 323 and the clamping section 324.

As can be seen in FIGS. 11 and 12, slots 326 are substantially radially symmetrical disposed around the clamping section 324. In this embodiment, the wire clamp 320 includes eight slots 326 substantially equally radially disposed around the clamping section 324. The number of slots 326 may be greater or less than eight, and the radial spacing between the slots 326 may vary, depending upon the dimension of the wire bundle 8 (FIG. 1) to be secured by a wire tie 130 (FIG. 3) within the clamping section 324.

Figure 13:
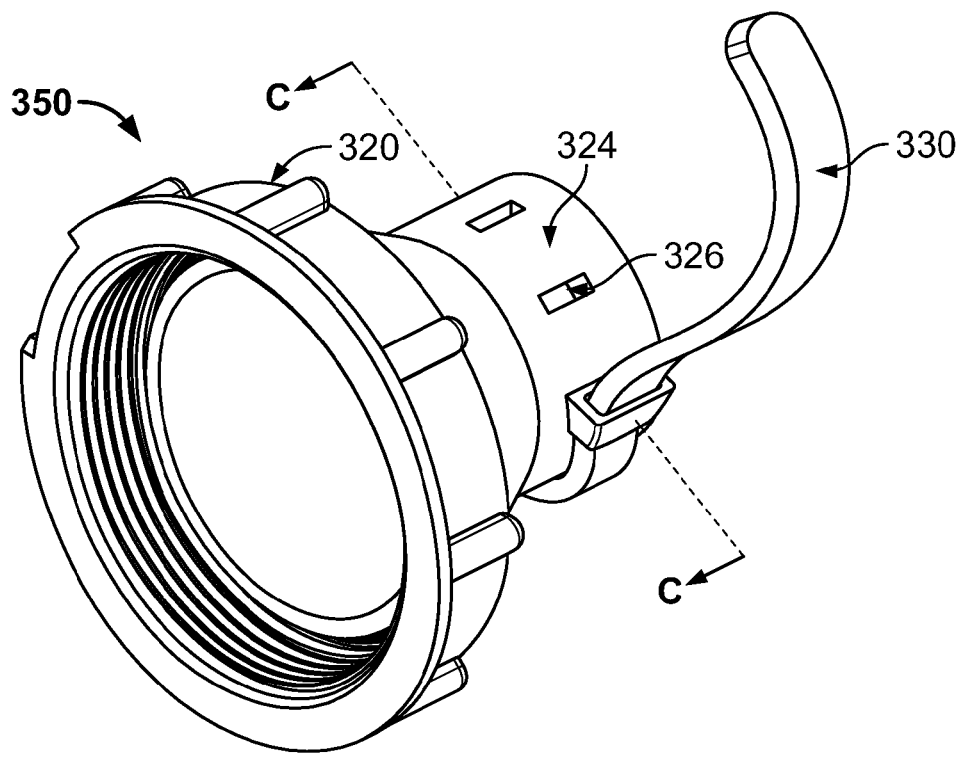
FIG. 13 illustrates a perspective view of an alternative exemplary embodiment of a wire clamp system according to the invention
Figure 14:
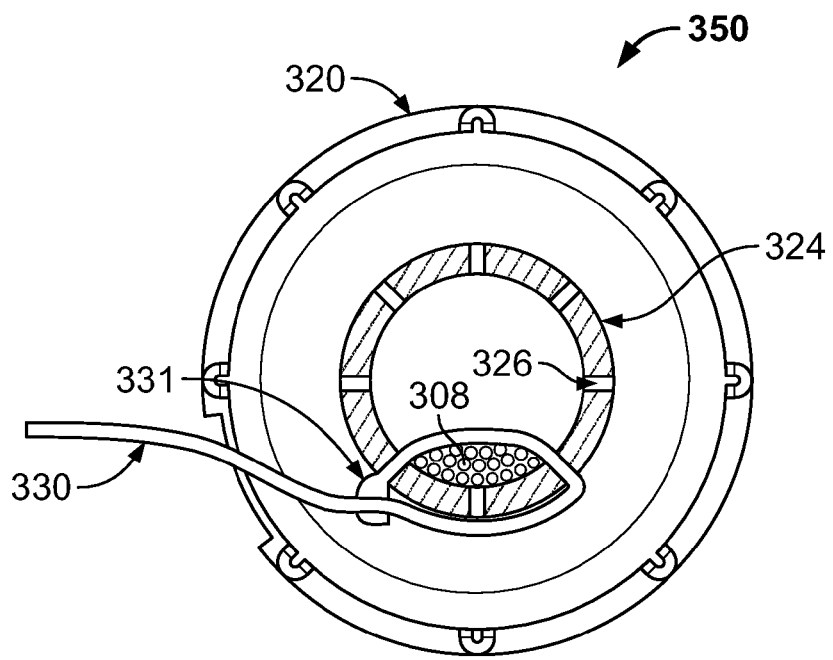
FIG. 14 is a cross sectional view the wire clamp system of FIG. 13 taken along line C-C incorporating a wire bundle 308.

A wire clamp system 350 including wire clamp 320 and a wire tie 330 is shown in FIG. 13. As shown in FIG. 13, the wire tie has been inserted and withdrawn through slots 326, engaged with itself, and has been tightened. FIG. 14 shows a cross sectional view of wire clamp 320 taken along line C-C of FIG. 13 after a wire bundle 308 has been passed through the clamp 320. As can be seen in FIG. 14, the wire bundle 308 has been secured by the wire tie 330 after the wire tie 330 has been engaged with itself through engaging section 331 and further tightened. As can be seen in FIG. 14, the slots 326 that the wire tie 330 is inserted through and withdrawn through are selected so the wire tie 330 tightens around the wire bundle 308 and applies a tension force to the wire tie 130 to secure the wire bundle 308 to the clamping section 324.

The selection of slots 326 that the tie 130 (FIG. 3) is inserted and withdrawn through depends upon the amount of space within the clamping section 324 that the wire bundle 308 (FIG. 14) occupies. For example, if wire bundle 308 (FIG. 14) occupies more than half of the space within the clamping section 324, the wire tie 330 (FIG. 3) may be inserted into a slot 326 and withdrawn from another slot 326 further radially separated from one another in the clamping section 324.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A wire clamp system comprising:
a connector housing;
a wire clamp; and
a wire tie;
wherein the wire clamp comprises:
a front cylindrical section, a clamping section, and a conical section disposed between the front cylindrical section and the clamping section, the clamping section comprising:
a unitary rigid base section comprising slots configured to receive the wire tie and secure a wire bundle within the clamping section.

2. The system of claim 1, wherein the front cylindrical section has internal threads.

3. The system of claim 1, wherein the base section has five slots.

4. The system of claim 1, wherein the clamping section comprises slots substantially symmetrically radially spaced around the clamping section.

5. The system of claim 1, wherein the conical section has a tapered cross section between the front section and the clamping section.

6. The system of claim 1, further comprising a bent section disposed between the conical section and the clamping section.

7. The system of claim 1, wherein the conical section is a bent conical section.

8. A wire clamp comprising:
a front cylindrical section;
a clamping section; and
a conical section disposed between the front cylindrical section and the clamping section;
wherein the clamping section comprises:
a unitary rigid base section comprising slots configured to receive a wire tie and secure a wire bundle within the clamping section.

9. The wire clamp of claim 8, wherein the front cylindrical section has internal threads.

10. The wire clamp of claim 8, wherein the clamping section further comprises a tie opening configured to receive the wire tie and allow the wire tie to be tightened within the clamping section radius.

11. The wire clamp of claim 8, wherein the base section comprises five slots substantially symmetrically radially spaced around the clamping section.

12. The wire clamp of claim 8, wherein the conical section has a tapered cross section between the front section and the clamping section.

13. The wire clamp of claim 8, further comprising a bent section disposed between the conical section and the clamping section.

14. The wire clamp of claim 8, wherein the conical section is a bent conical section.

15. An electrical connector comprising:
a connector housing; and
a wire clamp connected to the connector housing;
wherein the wire clamp comprises:
a front cylindrical section;
a clamping section; and
a conical section disposed between the front cylindrical section and the clamping section;
wherein the clamping section comprises:
a unitary rigid base section comprising slots configured to receive a wire tie that secures a wire bundle within the clamping section.

16. The electrical connector of claim 15, wherein the front cylindrical section has internal threads.

17. The electrical connector of claim 15, wherein the clamping section further comprises a tie opening spanning one half of the radius of the clamping section and configured to receive the wire tie and allow the wire tie to be tightened within the clamping section radius.

18. The electrical connector of claim 15, wherein the clamping section comprises slots substantially symmetrically radially spaced around the clamping section.

19. The electrical connector of claim 15, wherein the cross section of the conical section has either a taper from the front cylindrical section to the clamping section or a constant cross section between the front cylindrical section and the clamping section.

20. The electrical connector of claim 15, wherein the conical section is a bent conical section.

21. The system of claim 1, wherein the unitary rigid base section is disposed between the conical section and a rear cylindrical section.

22. The system of claim 21, wherein the clamping section further comprises
a tie opening defined by the unitary rigid base section, wherein the tie opening is configured to allow the wire tie to be drawn within the unitary rigid base section.

23. The wire clamp of claim 8, wherein the unitary rigid base section is disposed between the conical section and a rear cylindrical section.

24. The wire clamp of claim 23, wherein the clamping section further comprises
a tie opening defined by the unitary rigid base section, wherein the tie opening is configured to allow the wire tie to be drawn within the unitary rigid base section.

25. The electrical connector of claim 15, wherein the unitary rigid base section is disposed between the conical section and a rear cylindrical section.

26. The electrical connector of claim 25, wherein the clamping section further comprises
a tie opening defined by the unitary rigid base section, wherein the tie section is configured to allow the wire tie to be drawn within the unitary rigid base section.

* * * * *